J. N. BASHAW.
HEADLIGHT FOR AUTOMOBILES.
APPLICATION FILED FEB. 17, 1913.
1,088,055.
Patented Feb. 24, 1914.
2 SHEETS—SHEET 1.
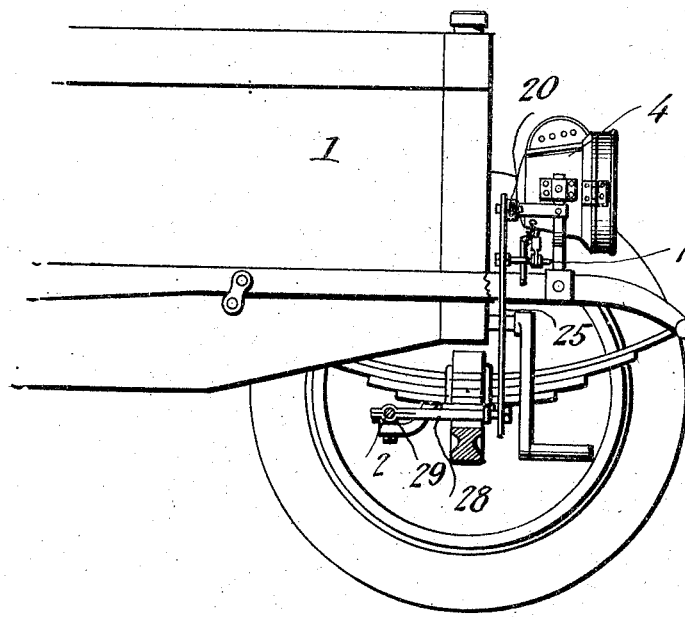
Fig. 1.
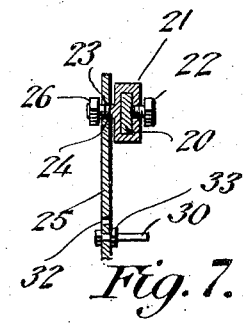
Fig. 7.
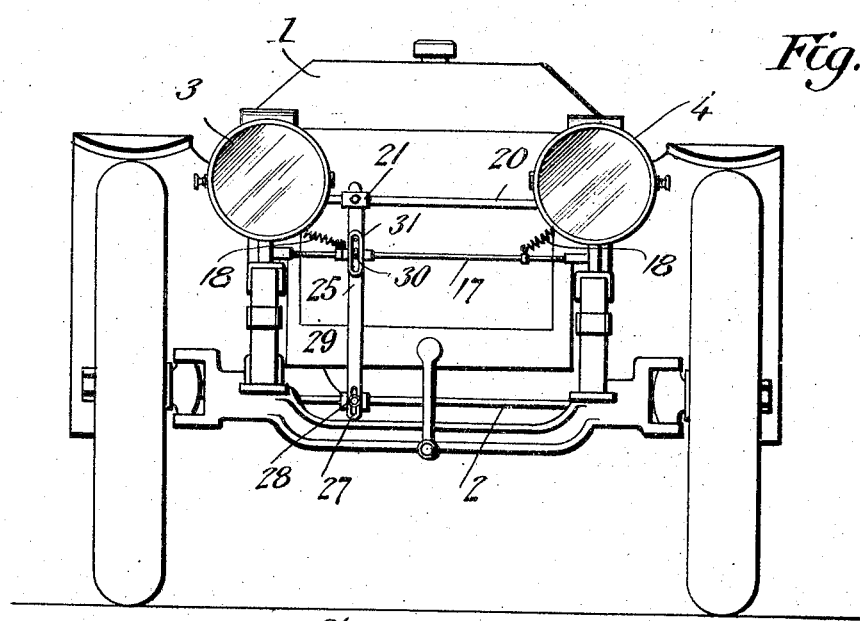
Fig. 2.
Fig. 6.
Witnesses
Inventor
John N. Bashaw
By
Attorney

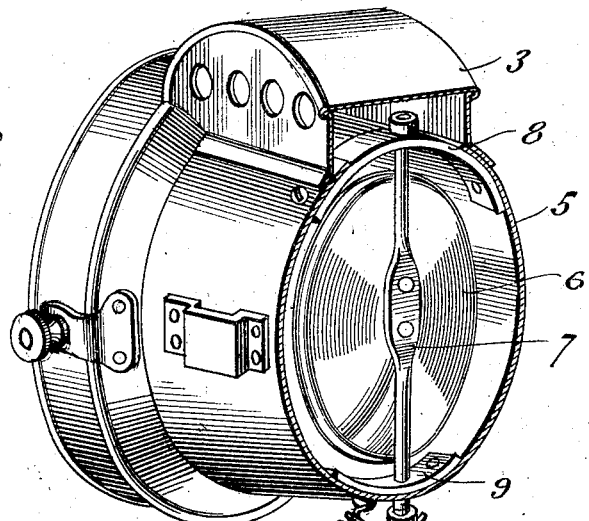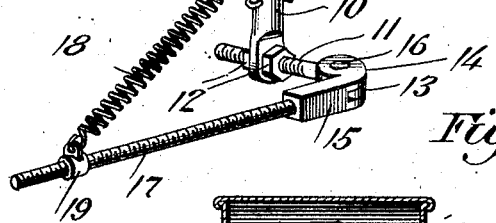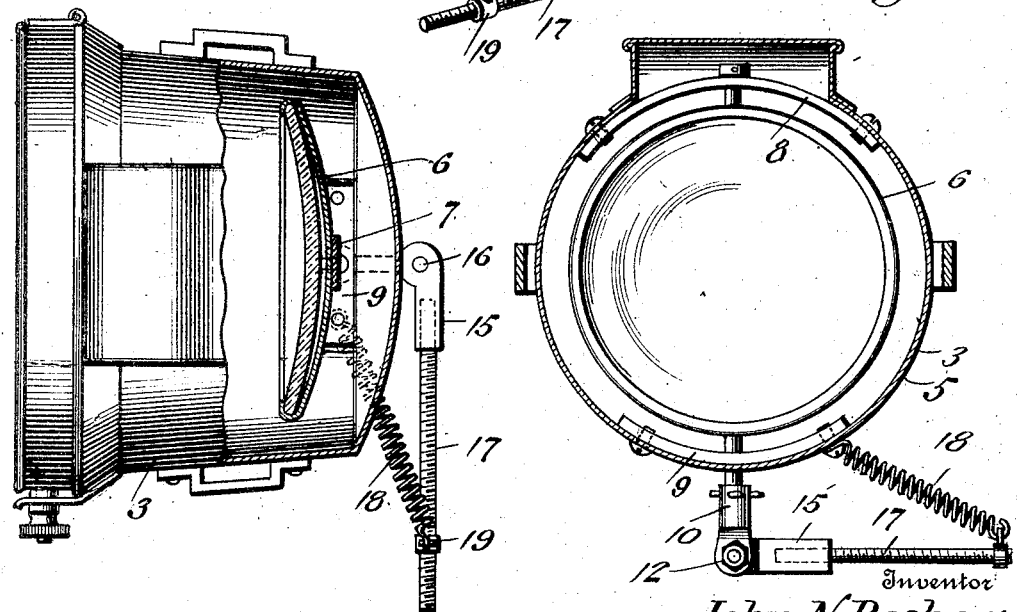

UNITED STATES PATENT OFFICE.

JOHN N. BASHAW, OF LAKE GENEVA, WISCONSIN.

HEADLIGHT FOR AUTOMOBILES.

1,088,055.  Specification of Letters Patent.  Patented Feb. 24, 1914.

Application filed February 17, 1913. Serial No. 748,888.

*To all whom it may concern:*

Be it known that I, JOHN N. BASHAW, a citizen of the United States, residing at Lake Geneva, in the county of Walworth and State of Wisconsin, have invented certain new and useful Improvements in Headlights for Automobiles, of which the following is a specification.

This invention relates to headlights for automobiles and other vehicles, and is designed to provide a means to effect a swinging of the reflector of the headlight when the vehicle rounds a curve, whereby the light will be reflected so as to automatically follow the curve which the vehicle is rounding.

The object of the invention is to provide a construction of headlight and actuating means for attaining the desired result in an effective manner, which means may be operated from the steering gear of the vehicle.

A further object of the invention is to provide means whereby the reflectors of two side lights may be operated in unison, whereby the headlight casings will be supported rigidly in position, whereby the extent of swinging movements of the reflectors may be varied, and whereby the reflectors will be positively returned after actuation to normal position.

The invention consists of the features of construction, combination and arrangement of parts hereinafter fully described and claimed, reference being had to the accompanying drawings, in which—

Figure 1 is a sectional side elevation showing the application of the invention to an automobile. Fig. 2 is a front elevation of the same. Fig. 3 is a rear perspective view of one of the lamps and associated reflector operating means, the lamp appearing in transverse section to expose the reflector. Fig. 4 is a top plan view of the same, with the lamp and reflector appearing in horizontal section. Fig. 5 is a vertical transverse section through the lamp. Fig. 6 is a view of the connecting rod uniting the bell crank levers associated with the respective reflectors. Fig. 7 is a detail vertical section through the actuating lever and its pivotal support.

Referring to the drawings, 1 designates an automobile or other vehicle, and 2 the transversely movable steering rod thereof, coupling the knuckles of the front steering wheels. Suitably supported at the front of the vehicle and upon opposite sides thereof are headlights 3 and 4, each comprising a lamp casing 5 having a reflector 6 disposed therein. The reflector 6 is suitably secured to a vertically arranged rock shaft 7 journaled at its upper and lower ends in bearing brackets 8 and 9 secured within the rear of the lamp casing. The lower end of the shaft 7 projects through the bottom of the casing and is suitably connected with a coupling member 10 provided with a threaded opening for the passage of a threaded crank stem 11 which is locked against relative turning movement therein by clamping nuts 12. The rear end of the stem 11 is provided with a head 13 which fits within the slotted or bifurcated arm 14 of a knuckle 15 and is pivotally connected therewith by a pin 16. The knuckle 15 is of angular form and its opposite end or arm is provided with a threaded socket to receive the adjacent threaded end of a transversely arranged connecting rod 17, which rod extends across the front of the vehicle and couples the crank stems and rock shafts of the reflectors of the headlights 3 and 4 for movement in the same direction in unison. It will be observed that the crank stems 11 are, by the construction described, adjustably connected with the coupling members 10 so that the throw of the rock shafts under the movement of the connecting rod 17 may be varied, whereby the extent of lateral swing of the reflectors may be regulated as desired. A coiled contractile spring 18 is connected with each lamp casing and adjustably secured to the threaded rod 17 by a coupling sleeve 19, whereby the spring may be tensioned to a desired degree to regulate its resistance to the movement of the rod as circumstances may require. These springs respectively act on the reverse movements of the rod 17 when the vehicle wheels are turned in one direction or the other to restore the reflectors to normal position as the wheels are brought back into a straight line with the vehicle.

The lamp casings are connected and rigidly held against movement by a rod or bar 20 on which is slidably fitted a sleeve 21 adapted to be secured in adjusted position by a set screw 22. The sleeve 21 is provided intermediate of its length with a pivot pin 23 adapted to pass through an opening 24 in the upper end of a vertically disposed actuating lever 25, which is thus adjustably pivoted thereon to swing in a direction transversely of the vehicle. The pin 23 is provided with a nut 26 to retain the lever in position, and at its lower end the lever is formed with a longitudinal slot 27 receiving a pivot pin 28 carried by a sleeve 29 suitably secured to the steering rod 2, whereby in the movements of said steering rod the lever will be actuated. Intermediate its ends the lever 25 is provided with a crank pin 30 engaging a slotted or looped portion 31 of the rod 17, whereby a sliding, pivotal connection between said lever and rod is provided for communicating motion to the rod to swing the reflectors when the steering rod is adjusted to transmit lateral steering motion to the steering wheel. The pin 30 is adapted to be fitted into any one of a series of openings 32 in the lever 25 and to be secured by a nut or other suitable fastening device 33, whereby the throw of the crank pin 30 may be varied as circumstances may require.

From the foregoing description, it will be seen that when the steering rod 2 is moved in one direction, toward, for instance, the right hand side of the vehicle to turn the steering wheels toward the left hand side of the vehicle, the lever 25 will be moved in the proper direction to swing the reflectors toward the left hand side of the vehicle, while when the steering rod is moved in the opposite direction or toward the left hand side of the vehicle to adjust the wheels toward the right hand side of the vehicle, the lever 25 will be correspondingly moved to adjust the reflectors toward the right hand side of the vehicle, the extent of movement of the reflectors being governed by the extent of steering movements of the wheels, as will be readily understood. Hence in the travel of the vehicle when a turn is made in one direction or the other the reflectors will be adjusted to direct the light ahead in the line of travel of the wheels, so that the light will automatically follow the curve which the vehicle is rounding. When the wheels are adjusted again for straight travel the springs 18 acting in conjunction with the operating means return the reflectors to normal position and retain them in such position to direct the light straight ahead. By disconnecting the lever 25 from the rod 2 and bar 20 the reflector turning mechanism may be thrown out of operation whenever desired, the springs 18 serving to hold the reflectors in normal position.

I claim:—

1. A headlight comprising a stationary casing, a swinging reflector in the casing, a shaft journaled in the casing and movably supporting the reflector therein, a bell crank lever having adjustable connection with the said shaft, an operating rod having connection with the bell crank lever and whereby, when the said rod is actuated, a swinging movement will be imparted to the said reflector, a spring having one end connected to the stationary casing, the said spring being adapted for opposing reverse movements of the said operating rod to maintain the reflector in normal position, and means adjustably connecting the other end of the said spring with the said operating rod for increasing or decreasing the tension of the said spring.

2. A headlight comprising a stationary casing, a swinging reflector in the casing, a shaft journaled in the casing and movably supporting the reflector therein, a bell crank lever having adjustable connection with the said shaft, an operating rod having connection with the bell crank lever and whereby, when the said rod is actuated, a swinging movement will be imparted to the said reflector, a spring having one end connected to the stationary casing, the said spring being adapted for opposing reverse movements of the said operating rod to maintain the reflector in normal position, and a sleeve having threaded connection with the operating rod and adapted to be advanced or retreated thereon, the said sleeve having the other end of the said spring connected thereto for increasing or decreasing the tension of the spring when the said sleeve is advanced or retreated on the said operating rod.

3. In combination with a vehicle body having a steering rod movable transversely thereof, of lamps upon opposite sides of the vehicle provided with swinging reflectors, bell crank levers, connected with the said reflectors, a rod connecting the said bell crank levers for moving the same in unison, an actuating lever supported upon the vehicle and having pivotal connection with the said steering and connecting rod, means actuated by the said steering rod for transmitting motion to the connecting rod, and springs having adjustable connection with the said connecting rod whereby the tension of the said springs can be increased or decreased to relatively oppose reverse movements of the said connecting rod and maintain the reflectors in normal position.

4. In combination with a vehicle having a steering rod movable transversely thereof, of lamp casings carried by the vehicle, reflectors movably supported in the said casings, rock shafts journaled in the casings and movably supporting the reflectors therein, crank devices having adjustable connection with the said rock shafts for imparting a swinging movement to the reflectors, a horizontal rod connecting the said crank devices for moving the same in unison, an actuating lever on the vehicle and having pin and slot connections with the said steering and connecting rods whereby when the said steering rod is actuated the said reflectors will be operated, and springs having connection with the said operating rod for opposing reverse movements thereof to maintain the reflectors in normal position.

5. In combination with a vehicle having a steering rod movable transversely thereof, of lamp casings carried by the vehicle, reflectors movably supported in the said casings, rock shafts journaled in the casings and movably supporting the reflectors therein, crank devices having adjustable connection with the said rock shafts for imparting a swinging movement to the reflectors, a horizontal rod connecting the said crank devices for moving the same in unison, an actuating lever on the vehicle and having pin and slot connections with the said steering and connecting rods whereby when the said steering rod is actuated the said reflectors will be operated, springs for opposing reverse movements of the operating rod to maintain the reflectors in normal position, and means connecting the springs with the said operating rod and adjustable on the operating rod for increasing or decreasing the tension of the springs.

In testimony whereof I affix my signature in presence of two witnesses.

JOHN N. BASHAW.

Witnesses:
  B. P. BISHOP,
  E. J. O'LEARY.

---

Copies of this patent may be obtained for five cents each, by addressing the "Commissioner of Patents, Washington, D. C."